(12) United States Patent
Westmacott et al.

(10) Patent No.: US 11,250,644 B2
(45) Date of Patent: Feb. 15, 2022

(54) METHOD AND SYSTEM FOR QUEUE LENGTH ANALYSIS

(71) Applicant: Sensormatic Electronics, LLC, Boca Raton, FL (US)

(72) Inventors: Ian C. Westmacott, Tewksbury, MA (US); Changchun Li, Concord, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/561,419

(22) Filed: Sep. 5, 2019

(65) Prior Publication Data

US 2019/0392222 A1 Dec. 26, 2019

Related U.S. Application Data

(62) Division of application No. 15/939,452, filed on Mar. 29, 2018, now Pat. No. 10,445,589, which is a
(Continued)

(51) Int. Cl.
*G06K 9/00* (2022.01)
*G06T 7/11* (2017.01)
(Continued)

(52) U.S. Cl.
CPC .............. *G06V 20/49* (2022.01); *G06T 7/11* (2017.01); *G06T 7/248* (2017.01); *G06V 20/52* (2022.01);
(Continued)

(58) Field of Classification Search
None
See application file for complete search history.

(56) References Cited

U.S. PATENT DOCUMENTS 5,097,328 A * 3/1992 Boyette .................. G06Q 10/06
348/150
6,195,121 B1 2/2001 Huang et al.
(Continued)

FOREIGN PATENT DOCUMENTS

EP 2105889 9/2009
EP 3043291 7/2016

OTHER PUBLICATIONS

Extended European Search Report, dated Sep. 14, 2016 from European Application No. 15200949.4, filed on Dec. 17, 2015. Eleven pages.
(Continued)

*Primary Examiner* — Nancy Bitar
(74) *Attorney, Agent, or Firm* — HoustonHogle LLP

(57) ABSTRACT

A system and method for analysing queues in frames of video enables operators to preferably draw three regions of interest overlaid upon the video as short, medium, and long queue regions that form a notional queue area within the video. The regions are drawn with knowledge of, or in anticipation of, foreground objects such as individuals and vehicles waiting for service in a queue. Examples include retail point of sale locations or for automated teller machine (ATM) transactions. In conjunction with a video analytics system that analyses the movement of the foreground objects relative to the queue regions, the system determines the number of objects occupying each queue region, length of the queue, and other queue-related statistics. The system can then create reports and send messages that include the queue analysis results for directing operators to change their staffing resources as part of a real-time queue servicing and optimization response.

15 Claims, 11 Drawing Sheets

Related U.S. Application Data division of application No. 14/575,567, filed on Dec. 18, 2014, now Pat. No. 9,965,684.

(51) Int. Cl.
*G06T 7/246* (2017.01)
*G06V 20/40* (2022.01)
*G06V 20/52* (2022.01)
*G06V 20/54* (2022.01)

(52) U.S. Cl.
CPC .......... *G06V 20/54* (2022.01); *G06T 2200/24* (2013.01); *G06T 2207/10016* (2013.01); *G06T 2207/20021* (2013.01); *G06T 2207/20104* (2013.01); *G06T 2207/30196* (2013.01)

(56) References Cited

U.S. PATENT DOCUMENTS

| | | | |
|---|---|---|---|
| 6,330,665 B1 | 12/2001 | Wise et al. | |
| 6,724,915 B1* | 4/2004 | Toklu | G06T 7/248 |
| | | | 382/103 |
| 8,224,028 B1 | 7/2012 | Golan et al. | |
| 9,245,247 B2 | 1/2016 | Raja et al. | |
| 9,471,889 B2* | 10/2016 | Burry | G06K 9/00711 |
| 9,965,674 B2 | 5/2018 | Long et al. | |
| 9,965,684 B2 | 5/2018 | Westmacott et al. | |
| 2007/0127774 A1* | 6/2007 | Zhang | G06K 9/00771 |
| | | | 382/103 |
| 2008/0094250 A1 | 4/2008 | Myr | |
| 2009/0118002 A1* | 5/2009 | Lyons | G06Q 30/0255 |
| | | | 463/29 |
| 2009/0322881 A1 | 12/2009 | Shu et al. | |
| 2011/0228984 A1 | 9/2011 | Papke et al. | |
| 2011/0231419 A1* | 9/2011 | Papke | G06F 16/784 |
| | | | 707/756 |
| 2015/0169954 A1 | 6/2015 | Schlattmann et al. | |
| 2016/0224845 A1 | 8/2016 | Gyger et al. | |

OTHER PUBLICATIONS

Morris, T., et al. "Low-Cost Portable Video-Based Queue Detection for Work-Zone Safety: Final Report," University of Minnesota, Jan. 2011. 53 pages.
Partial European Search Report, dated May 18, 2016, from European Application No. 15200949.4 filed on Dec. 17, 2015. Six pages.
TrueView Queue—Manual. Cognimatics. 2014. 24 pages.

* cited by examiner

METHOD AND SYSTEM FOR QUEUE LENGTH ANALYSIS

RELATED APPLICATIONS

This application is a Divisional of U.S. application Ser. No. 15/939,452, filed on Mar. 29, 2018, which is a Divisional of U.S. application Ser. No. 14/575,567, filed on Dec. 18, 2014, both of which are incorporated herein by reference in their entirety.

BACKGROUND OF THE INVENTION

Video security systems have been traditionally used to help protect people, property, and reduce crime for homeowners and businesses alike and have become an increasingly cost-effective tool to reduce risk. Modern systems with video analytics capabilities provide the ability to detect and track individuals and objects within monitored scenes. These systems can provide both live monitoring of individuals, and forensic analysis of saved security video data to spot trends and search for specific behaviors of interest.

More recently, these video systems have been used to track usage and facilitate resource management, in general. For example, of increasing interest is the ability to identify and analyze a notional queue of objects. Examples here might be a line of individuals queueing at a point of sale location or a line of cars at a drive up window.

A number of solutions exist for analyzing queues. In one, areas of interest are defined within a frame of video to provide an estimate of the number of individuals in the area. Another solution defines an area within a scene of video to detect a queue of vehicles in the scene, where the region definition is calibrated in conjunction with radar-based sensors mounted in traffic lanes. Yet another solution defines separate regions within the scene and estimates wait times for objects in the queue relative to a difference in service times of two or more events associated with objects within the regions. In yet another example of analyzing queues, a system divides scene into slots, where each slot is approximately the size of an individual. The system detects a queue within the video based on motion of the individuals across the slots and counts the individuals that occupy the slots. Finally, still another system estimates wait times for individuals performing retail transactions in a notional transaction queue. The system first identifies each individual and the items they present for transaction at a point of sale location. Then, the system determines the time it takes to transact each item, and estimates the total service time for an individual as the aggregate of the transaction processing times for their items.

SUMMARY OF THE INVENTION

Current systems and methods for analyzing queues have problems. The current solutions that estimate the number of individuals in a queue and their wait times provide inaccurate estimates when other foreground objects occlude the individuals in a scene and when a group of individuals arrive or converge within a scene in a short period of time. Solutions that rely on radar data from sensors in conjunction with video data to determine vehicles in a queue are complicated and prone to error. This is because these systems require calibration between the radar sensors and the video camera taking the video data footage and require measuring the speed of the vehicles.

In other examples, dividing scenes of video into human-sized slots requires careful selection of the video camera angle when capturing the scene and is prone to error as the distance between individuals in the scene and the video camera increases. This solution also suffers from the same occlusion and grouping issues. Finally, solutions that provide an estimate of wait times for individuals based on the aggregate of the estimate of wait times of their transacted items have difficulty identifying the number of items each individual presents at the point of sale. The items can be held within a person's hand, shopping basket or cart, in examples. As a result, these solutions typically have difficulty distinguishing between items. This impacts the transaction wait time estimate of the items, and therefore the overall wait time estimate of the individual.

The present invention takes a different approach by defining queue regions in a queue area. The present invention determines objects in each queue region based on spatial overlap between the objects and the queue regions. To avoid the pitfalls of current estimation solutions, an operator's prior knowledge of camera positioning and angle for capturing the video data of the scene can be used in the definition of the queue regions.

Moreover, the present invention enables operators to define preferably two, three or more queue regions forming the queue area. Operators draw the queue regions over the video data. The queue regions are associated with short, medium, and long queue lengths. The operators can then define event triggers for critical events associated with each of the queue regions.

Users that can benefit from such a system include establishments that provide retail point of sale transactions and businesses that provide drive-through or drive-up window customer service, such as banks with Automated Teller Machines (ATM) and fast food restaurants, in examples. Because the system creates reports and sends electronic messages such as audio messages that include the queue analysis results, in response to events that satisfy defined event triggers associated with the queue regions, the system can be utilized as part of a real-time retail staffing and resource optimization response.

In general, according to one aspect, the invention features a method for monitoring queues in a video analysis system. The method comprises generating video data of a monitored area and analyzing objects relative to a queue area within the video data to determine if the objects belong to one or more queue regions forming the queue area, and to determine a queue length.

Determining the queue length includes successively determining if each of the queue regions is occupied, in one implementation. The method enables drawing of the queue regions over the video data. In examples, the queue regions are rectangular or trapezoidal.

Preferably, the method defines a short queue region, a medium queue region, and a long queue region of the queue regions. Objects are determined to have entered the queue area by determining if the objects intersect with the queue area by a minimum queue area intersection amount. The method can also determine whether each object occupies the queue area by determining that each object intersects with the queue area by a minimum queue area intersection amount for a predetermined period of time.

The objects are preferably determined to belong to the one or more queue regions forming the queue area by determining areas of intersection of the objects upon the queue regions, and marking each object as belonging to one or more of the queue regions. The method marks each object as belonging to one or more of the queue regions if the area of intersection between each object and a queue region, known as a marked area of intersection, is at least equal to a minimum queue region intersection threshold.

The queue length is preferably determined by calculating a union, for each of the queue regions, of the marked areas of intersection, and comparing the union of the marked areas of intersection of the objects belonging to each of the queue regions, to a minimum occupancy area for each of the queue regions. The method determines a number of objects that are within the queue area by counting the objects that belong to the one or more queue regions forming the queue area.

In general, according to another aspect, the invention features a video analysis system for monitoring queues. The system comprises at least one video camera generating video data of a monitored area and a video analytics system that analyzes objects relative to a queue area within the video data to determine if the objects belong to one or more queue regions forming the queue area, and to determine a queue length.

The system can further include a security system workstation enabling definition of the queue regions forming the queue area. The security system workstation includes a display, a user interface application that enables access to the video data via the video analytics system, one or more user input devices, and a drawing tool for defining the queue regions, wherein the queue regions are drawn over the video data. In examples, the queue regions are rectangular or trapezoidal in shape.

The video analytics system typically determines if the objects belong to a short queue region, a medium queue region, and a long queue region. The video analytics system also determines the queue length by successively determining if each of the queue regions is occupied, and determines if the objects have entered the queue area, by determining if the objects intersect with the queue area by a minimum queue area intersection amount.

Additionally, the video analytics system can determine that each object occupies the queue area by determining that each object intersects with the queue area by a minimum queue area intersection amount for a predetermined period of time.

Further still, the video analytics system can determine whether objects belong to the one or more queue regions forming the queue area by determining areas of intersection of the objects upon the queue regions, and marking each object as belonging to one or more of the queue regions. The video analytics system marks each object as belonging to one or more of the queue regions if the area of intersection between each object and a queue region, known as a marked area of intersection, is at least equal to a minimum queue region intersection threshold.

In yet another example, the video analytics system determines the queue length by calculating a union, for each of the queue regions, of the marked areas of intersection, and comparing the union of the marked areas of intersection of the objects belonging to each of the queue regions, to a minimum occupancy area for each of the queue regions.

In general, according to yet another aspect, the invention features a method for determining occupancy of objects in an area, such as a queue, within a scene of video data using a video analysis system. The method defines queue or other regions forming the queue or other type of area, and determines that each object occupies the queue area by determining that each object intersects with the queue area by a minimum queue area intersection amount for a predetermined period of time.

Then, the method determine can areas of intersection of the objects upon the queue regions, and marks each object as occupying one or more of the queue regions, if the area of intersection between each object and a queue region, known as a marked area of intersection, is at least equal to a minimum queue region intersection threshold.

Additionally, the method can determine length of the queue area by first calculating a union, for each of the queue regions, of the marked areas of intersection, and then comparing the union of the marked areas of intersection of the objects occupying each of the queue regions, to a minimum occupancy area for each of the queue regions.

According to another feature, the method can accomplish defining the queue regions forming the queue area using a video analytics system of the video analysis system. In examples, defining the queue regions forming the queue area comprises defining a short queue region, a medium queue region, and a long queue region of the queue regions. The queue regions can be rectangular or trapezoidal, in examples.

In general, according to an additional aspect, the invention features a method of operation of a finite state machine of a video analytics system for determining whether an object has entered or exited queue regions forming a queue area, for example, across frames of video data. Firstly, the method assigns the object as initially being in an unknown state, and identifies a tracking mask associated with the object in a current frame of the video data.

Secondly, the method determines that the object remains in the unknown state when the object does not have a bounding box in a next frame of the video data. Thirdly, the method determines that the object has transitioned to a state indicating that the object has exited the queue or other type of regions, when the object has a tracking mask in the next frame of video data that does not overlap with any queue regions by a predetermined amount.

Finally, the method determines that the object has transitioned to a state indicating that the object has entered an identified queue region, or other type of region, of the queue regions, when the object has a tracking mask in the next frame of video data that overlaps with the identified queue region of the queue regions by the predetermined amount.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
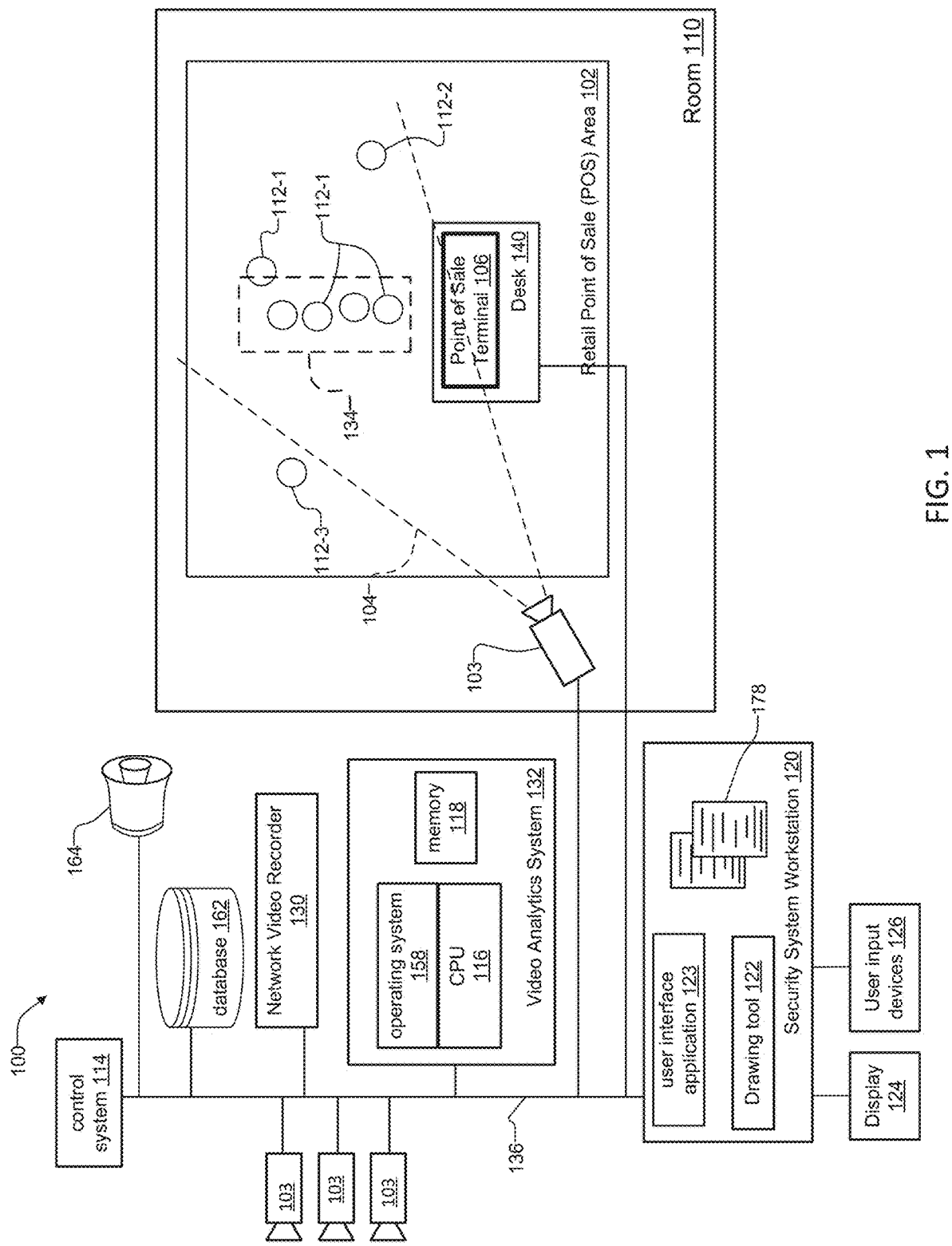
FIG. 1 is a schematic diagram of a first example video security analysis system monitoring a retail point of sale (POS) area within a room, and includes individuals waiting in a queue at a POS terminal within the retail POS area.

FIG. 1 shows a first example video security analysis system 100 monitoring a retail point of sale (POS) area 102 within a room 110. The video analytics system 100 includes components that communicate over a data network 136, which could be a dedicated security network, such as video cameras 103, a metadata database 162, a network video recorder 130, a video analytics system 132, a security system workstation 120, and a speaker system 164. A control system 114 controls the components over the security network 136. The video analytics system 132 includes non-transitory memory 118 and an operating system 158 that runs on top of a central processing unit (CPU) 116.

In operation, the video analytics system 132 analyzes objects relative to a queue area 134 within the video data to determine if the objects belong to one or more queue regions forming the queue area 134. And this information is used to determine a queue length.

The network video recorder 130 records video data from the video cameras 103. The video data usually includes metadata, such as time stamp information for each frame of the video data. Additionally, metadata database 162 can save the recorded video data, detected object data, and queue length event trigger data, in examples. The video analytics system 132 receives live video data over the security network 136 from the video cameras 103, and receives historical video data over the security network 136 from either the database 162 or the network video recorder 130, in examples.

The security system workstation 120 includes a user interface application 123 and a drawing tool 122. Operators interact with the user interface application 123 and the drawing tool 122 via user input devices 126 such as a keyboard and mouse, and a touchscreen of a display 124, in examples. Using the drawing tool 122 and the display 124, the operator interacts with the video analytics system 132 to define regions of interest upon the video data, such as a notional queue area 134 and its queue regions. In one example, the operator defines the boundaries of the queue area 134 in response to anticipated traffic patterns of individuals 112 waiting for service within the retail point of sale area 102.

To setup the system 100, an operator positions one or more video cameras 103 over or outside the retail POS area 102. This enables the field of view 104 of the video camera 103 to include foreground objects such as individuals 112-1 located in or near a queue area 134 within the retail POS area 102. The field of view 104 also often includes a point of sale terminal 106 on top of a desk 140 located near the queue area 134. This allows the video camera to capture the individuals 112-1 as they wait and/or perform transactions within the queue area 134. If possible, operators also position the video camera 103 such that individuals 112-2 and 112-3 located well outside the queue area 134 are excluded from the field of view 104.

Using the user interface application 123, the operator can define event triggers associated with movement of objects relative to the queue area 134 and specifically the queue regions. The video analytics system 132 typically stores the event triggers as metadata associated with the video. The video analytics system 132 stores the metadata within or in connection with each video frame, and to the metadata database 162, in examples.

In response to events that occur within the frames of video data that satisfy the defined event triggers, the video analytics system 132 can generate messages that include information associated with the events that satisfy the event triggers. The video analytics system 132 includes the messages in a report 178. Automatic messages can also be generated such as audio messages via speaker 164 or electronic messages sent from the control system 114 to the point of sale terminal 106. Additionally, the messages can be sent to other systems on the security network 136 or to systems on other networks via a gateway.

Figure 2:
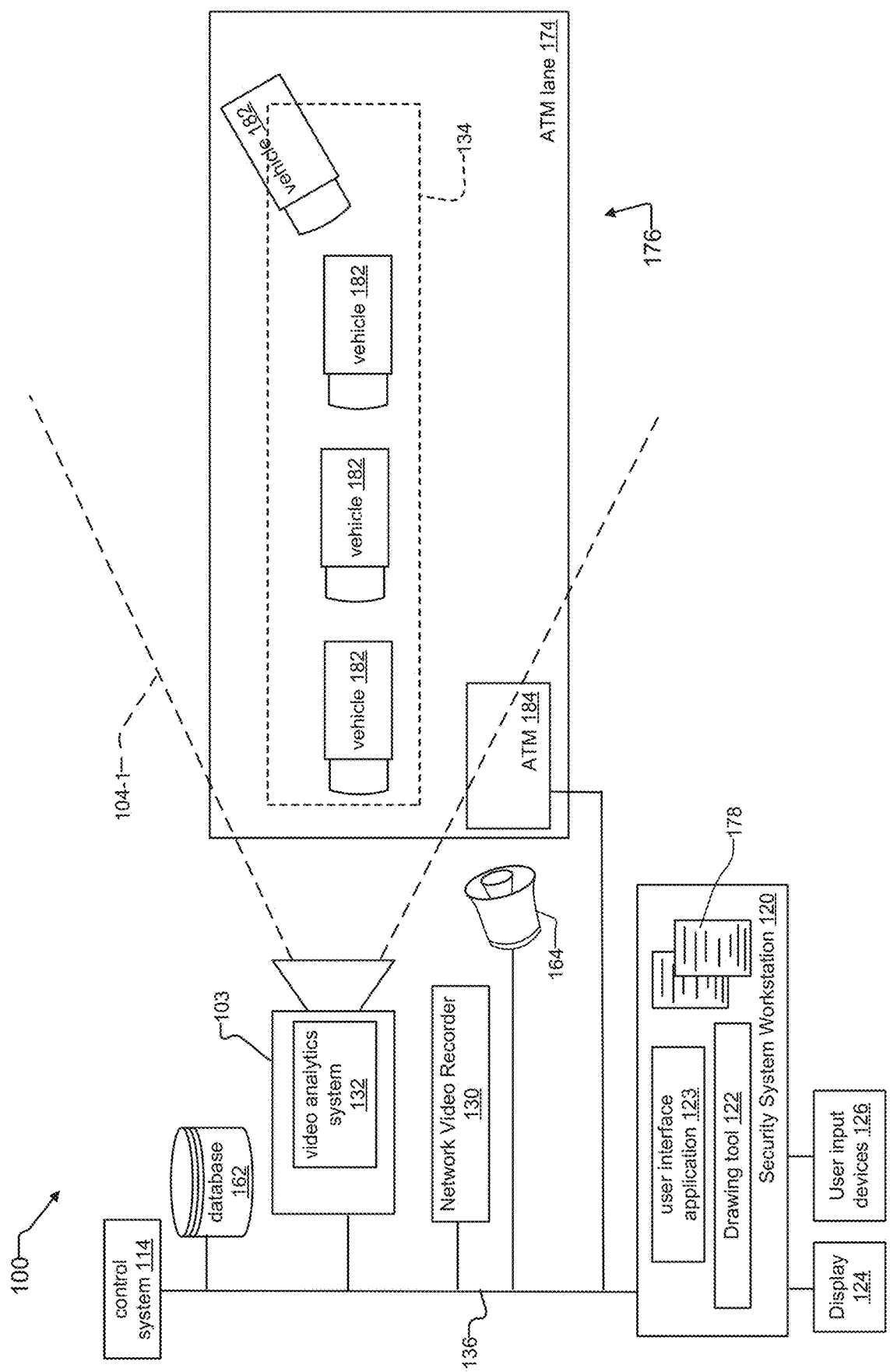
FIG. 2 is a schematic diagram of a second example video security analysis system monitoring vehicles in a queue at an automated teller machine (ATM) lane of a bank.

FIG. 2 shows a second example video security analysis system 100 monitoring an Automated Teller Machine (ATM) lane 174 at a bank 176. A related example would be a drive-up window at a fast-food restaurant.

To illustrate an alternative configuration, in this example, the video camera 103 has an integrated video analytics system 132 that operates as a functional equivalent of the separate, remote, dedicated video analytics system 132 in the system of FIG. 1.

Operators position one or more video cameras 103 to capture objects such as vehicles 182 within or near a queue area 134 of the ATM lane 174. The field of view 104 also includes an ATM 184 located near the queue area 134. This allows the video camera to capture the vehicles 182 and their individuals 112 as the individuals 112 perform ATM transactions within the queue area 134.

Using the user interface application 123, the operator can define event triggers associated with movement of the vehicles 182 and other foreground objects relative to the queue area 134. The video analytics system 132 typically stores the event triggers as metadata within each video frame.

In response to events that occur within the frames of video data that satisfy the defined event triggers, the video analytics system 132 can generate messages that include information associated with the events that satisfy the event triggers. The video analytics system 132 includes the messages in a report 178.

Figure 3:
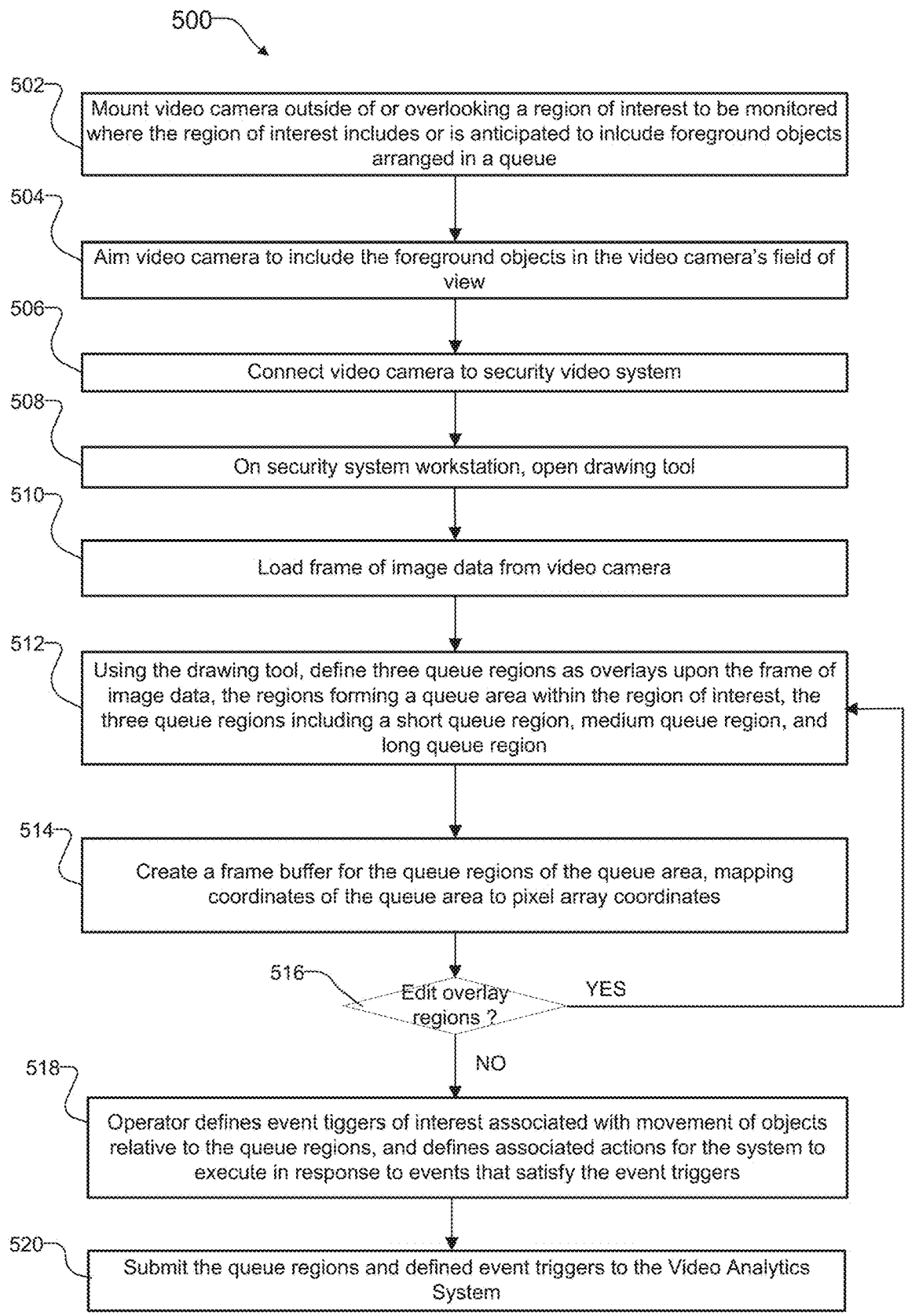
FIG. 3 is a flow chart showing a setup method for defining queue regions that form a queue area within a frame of image data taken by a video camera.

FIG. 3 is a flow chart showing a setup method 500 for defining queue regions that form a queue area 134 within a frame of image data taken by a video camera 103 according to principles of the invention.

In step 502, an operator mounts a video camera 103 outside of or overlooking a region of interest to be monitored. The region includes or is anticipated to include foreground objects arranged in a queue. The operator aims the video camera 103 to include the foreground objects in the field of view 104 of the video camera 103 in step 504. Then, in step 506, the operator connects the video camera 103 to the security video system 100.

According to step 508, on the security system workstation 120, the operator opens the drawing tool 122. In step 510, the drawing tool 122 loads the frame of image data from the video camera 103. In step 512, using the drawing tool 122, the operator preferably defines three queue regions as overlays upon the frame of image data. The regions form a queue area 134 within the region of interest.

Figure 4:
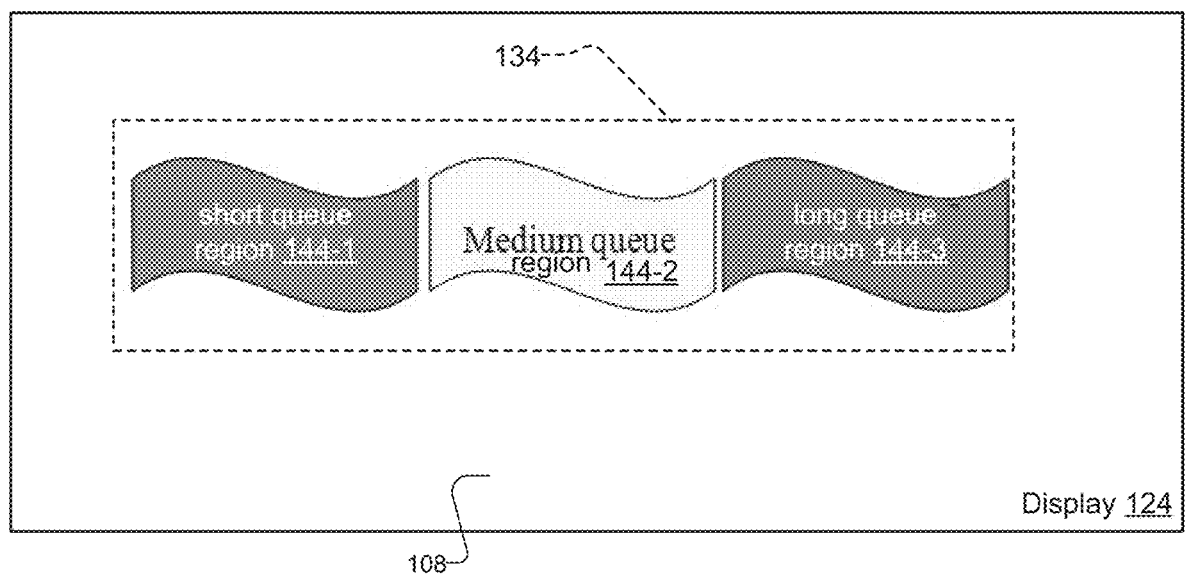
FIG. 4 is a schematic diagram that shows a frame of video data divided into short, medium, and long queue regions forming the queue area, in support of the method in FIG. 3.

FIG. 4 shows three exemplary queue regions including a short queue region 144-1, a medium queue region 144-2, and a long queue region 144-3. Using the drawing tool 122, an operator draws the queue regions upon an image frame 108 of video data displayed on the display 124. Each queue region can be drawn using a different shape and size as determined by the operator based on his/her analysis objectives. In examples, the queue regions can overlap, be superimposed upon or included within another, or be arranged adjacent to one another in a linear fashion. Preferably, the operator defines the queue regions in a manner that most resembles an anticipated notional queue of objects awaiting service within the scene.

As a result, the queue regions will have different shapes depending on camera position. For example with an overhead, look-down camera, the queue regions will often be rectangular, stretching in the direction of the queue. On the other hand, if the camera is located to the side or ahead or behind the queue, the queue regions might be trapezoidal due to the perspective of the camera.

Returning to FIG. 3, in step 514, the video analytics system 132 creates a frame buffer for the queue regions that form the queue area 134, mapping coordinates of the queue area 134 to pixel array coordinates. The operator can edit the overlay regions in step 516, returning to step 512 to redefine the regions. When the operator is done drawing the regions, the method transitions to step 518.

In step 518, the operator defines event triggers of interest associated with movement of objects relative to the queue regions. In response to events that satisfy the event triggers, the system executes actions associated with the events, such as sending alert messages over the security network or generating audio messages using speaker 164, for example. Finally, in step 520, the operator submits the defined queue regions and event triggers to the video analytics system 132.

Figure 5A:
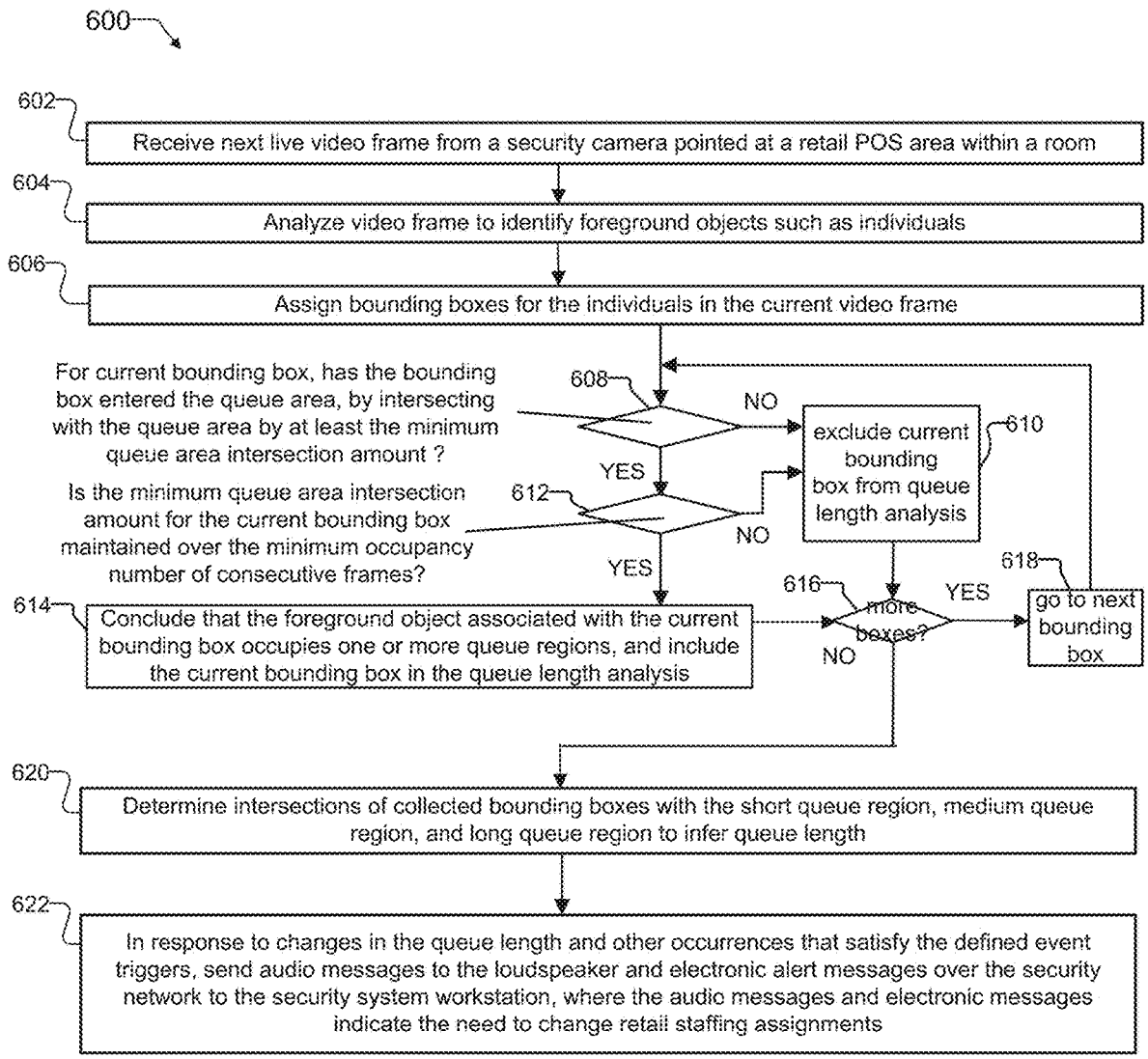
FIG. 5A is a flow chart of a method for real-time processing of video data of the retail POS area in FIG. 1, according to principles of the present invention.

FIG. 5A shows a method 600 for a "live video" example for how the video analytics system 132 determines queue length within a scene of video data. The example is with respect to the retail POS area 102 of FIG. 1.

In step 602, the video analytics system 132 receives the next frame or frames of video or a combination of several frames from a video camera 103 pointed at a retail POS area 102 within a room 110. In step 604, the analytics system 132 analyzes the video to identify foreground objects such as individuals 112. According to step 606, the analytics system 132 assigns bounding boxes or other tracking mask 128 for the individuals in the current video frame 108.

Figure 6:
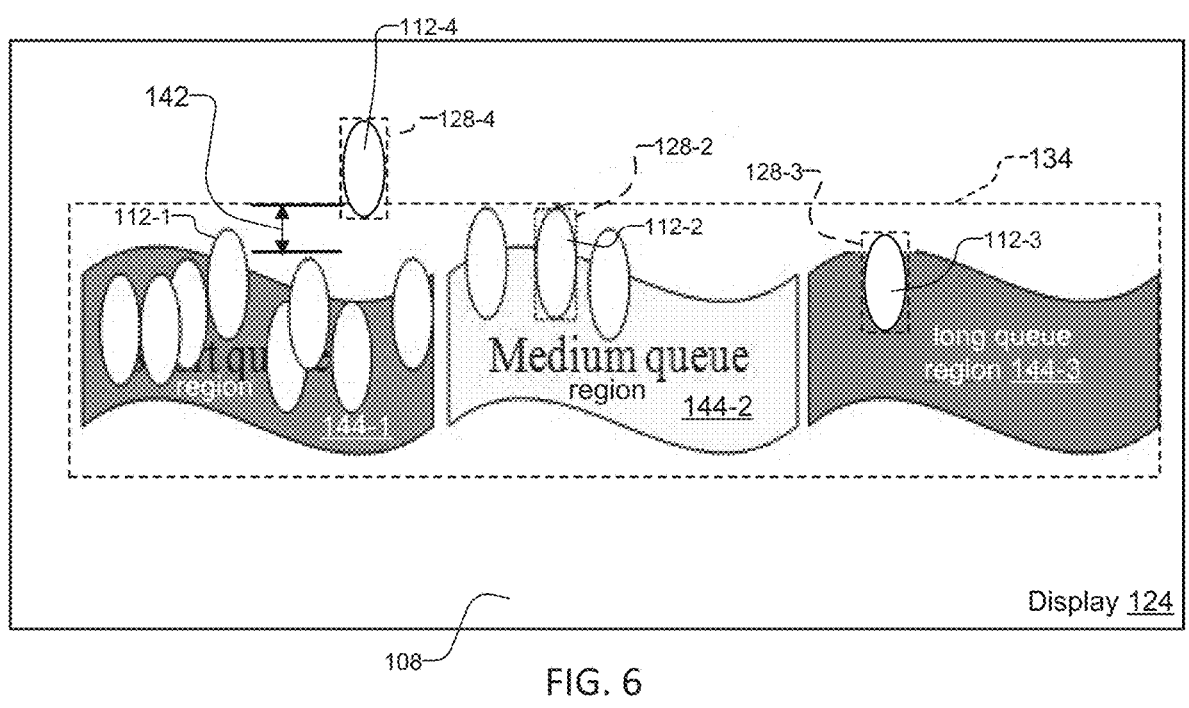
FIG. 6 and FIG. 7A-C are schematic diagrams showing short, medium, and long queue regions forming the queue area, that support the methods of FIG. 5A and FIG. 5B.

FIG. 6 shows bounding boxes 128 that the analytics system 132 has generated around foreground objects such as individuals 112 in an exemplary video frame 108. In the video frame 108, only the heads of the individuals 112 can be seen because the video camera is mounted to overlook the retail POS area 102. For this reason, the individuals 112 are represented as oval-shaped objects. Individuals 112-1, 112-2, and 112-3 are located within or near short queue region 144-1, medium queue region 144-2, and long queue region 144-3, respectively. While the illustrated analytics system 132 encloses individuals 112 within a rectangular bounding box 128, triangular-shaped regions and other forms of tracking masks can enclose or otherwise represent the space each individual occupies within the video frame 108.

It can also be appreciated that the analytics system 132 generates tracking masks or notional bounding boxes 128 around other types of foreground objects, such as for the vehicles 182 waiting in line to perform transactions at the ATM 184 of bank 176 in FIG. 2.

Operators will typically define a minimum queue area intersection amount 142 for the queue area 134. This is used to first determine if objects such as the individuals 112 are located within or near the queue area 134. In examples, individuals 112-4 and 112-3 are located outside and inside the queue area 134, respectively. This is because bounding box 128-4 for individual 112-4 does not overlap the queue area 134 by at least the minimum queue area intersection amount 142, and because bounding box 128-3 for individual 112-3 does overlap the queue area 134 by at least the minimum queue area intersection amount 142.

Returning to FIG. 5A, in step 608, the method determines if the current bounding box 128 for an individual 112 has entered the queue area 134. The individual 112 has entered the queue area 134 if its bounding box 128 intersects with the queue area by at least the minimum queue area intersection amount 142. If the individual 112 has entered the queue area 134, the method transitions to step 612 to determine if objects entering the queue area remain within the queue area for a minimum occupancy period and are therefore not transient. Otherwise, the method transitions to step 610.

Figure 7A:
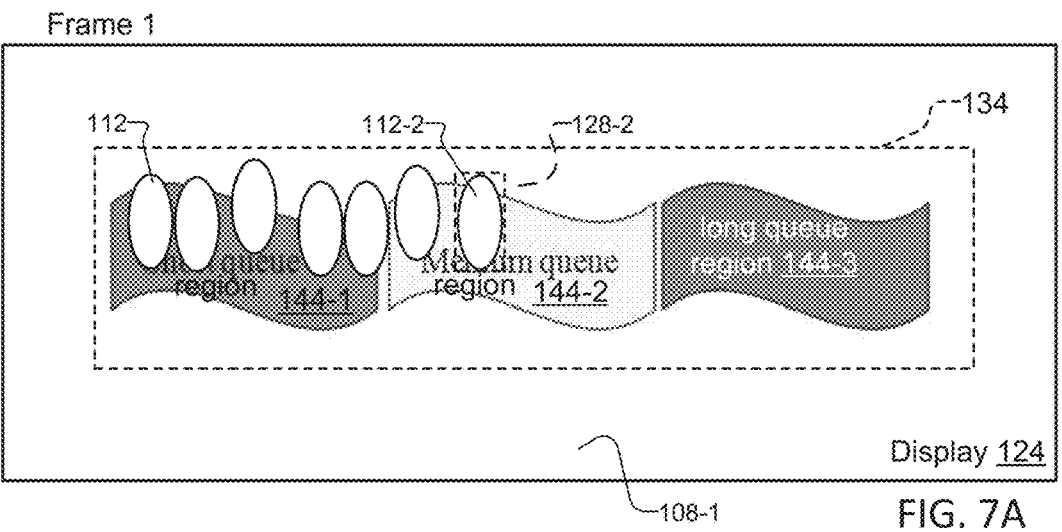
Figure 7B:
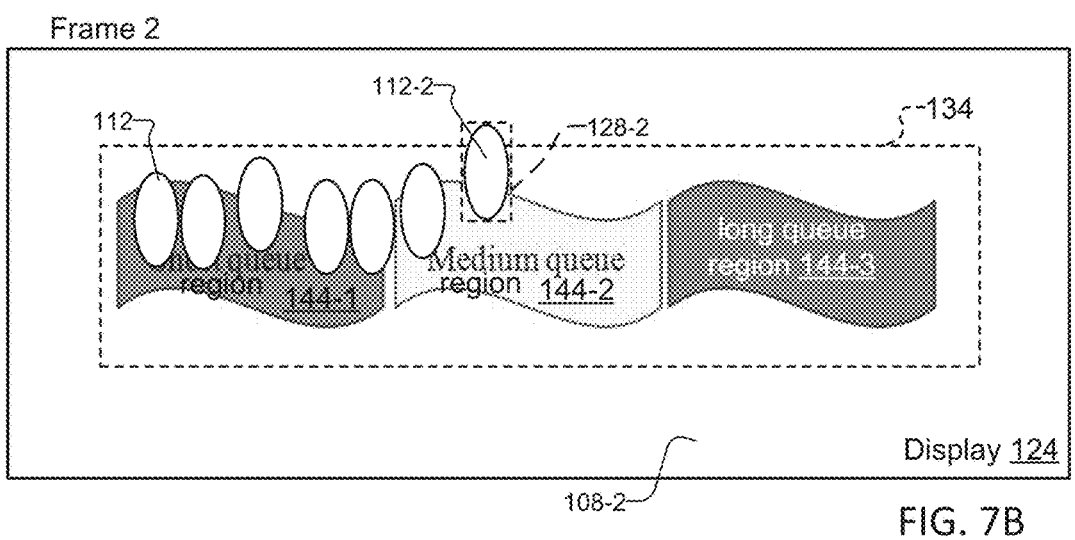
Figure 7C:
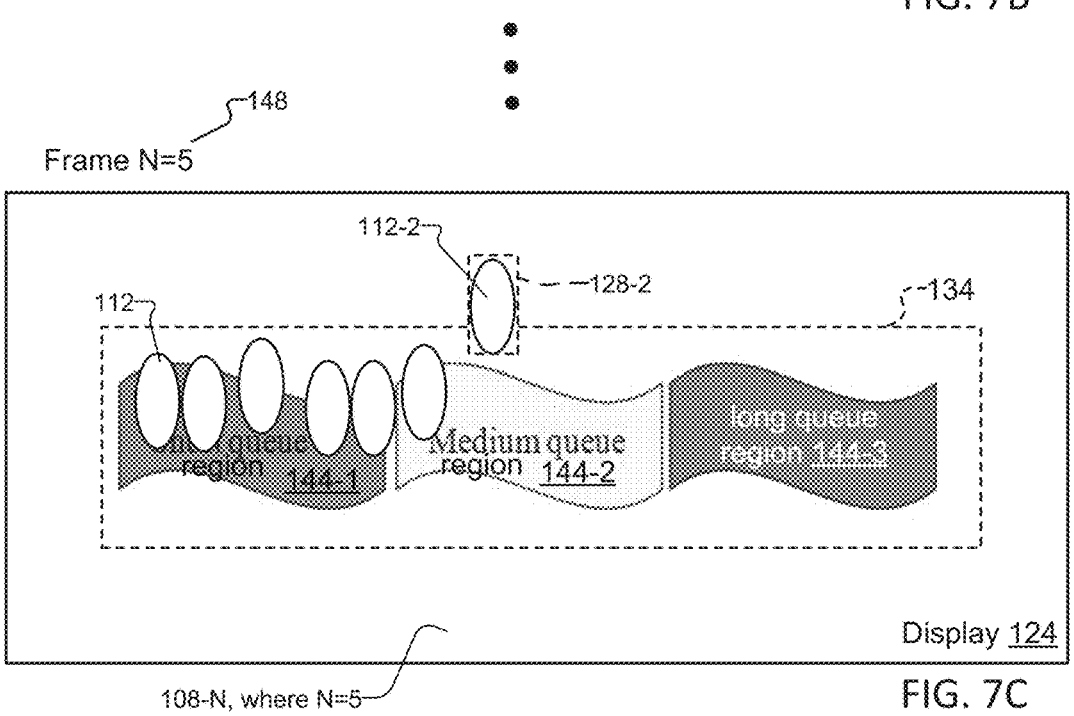

FIG. 7A-7C illustrate the determination of the minimum occupancy period calculated in step 612. FIG. 7A shows multiple individuals 112 located within a queue area 134 of a video frame 108 of a scene, with individual 112-2 located mostly within medium queue region 144-2 and completely located within the queue area 134. The video frame 108 is the first frame in a series of consecutive frames. The operator defines a minimum consecutive number of frames or video run time 148 to assist in the calculation of the queue area minimum occupancy period, such as the number of frames corresponding to 5 or more seconds of video run time.

FIG. 7B shows the subsequent frame of video of the same scene. The individuals 112 have not changed their positions within the scene with the exception of individual 112-2, who is now located partially within medium queue region 144-2 and partially outside the queue area 134. This is likely associated with the individual 112-2 starting to leave the queue area 134.

FIG. 7C shows still a further subsequent frame of video 108 of the same scene. The individuals 112 have not changed their positions within the scene, again with the exception of individual 112-2, who is now located completely outside medium queue region 144-2 and mostly outside the queue area 134. This shows that while all other individuals 112 have remained within the queue area 134 over the minimum consecutive number of frames 148 (frames of 5 seconds of runtime, in this example) of video, individual 112-2 has continued moving away from and is leaving the queue area 134.

Returning to FIG. 5A, upon completion of step 612, the method transitions to step 614 if the current bounding box 128 was determined to have entered the queue area 134 and remained within the queue area 134 for at least the minimum consecutive number of frames 148. Otherwise, the method transitions to step 610.

Step 610 is reached when the bounding box 128 associated with an object was determined to be effectively located outside of the queue area 134. As a result, step 610 removes the bounding box 128 from the queue length analysis, and transitions to step 616 to look for more bounding boxes 128 within the video data.

Step 614 is reached when each bounding box 128 associated with an object was determined to be within the queue area 134. In step 614, the analytics system 132 concludes that the foreground object associated with the bounding box 128 occupies one or more queue regions and includes the bounding box 128 as part of the analysis for determining the queue length. The method then transitions to step 616 to look for more bounding boxes 128.

If there are more bounding boxes 128 to process in step 616, the method transitions to step 618 to go to the next bounding box 128. Otherwise, the method transitions to step 620. Upon completion of step 618, the method transitions to the beginning of step 608 to determine if the next bounding box 128 has entered the queue area 134.

In step 620, the method determines intersections of the bounding boxes 128 collected in step 614 with the short, medium, and long queue regions 144-1, 144-2, and 144-3, respectively, to infer the length of the queue area 134.

Figure 8:
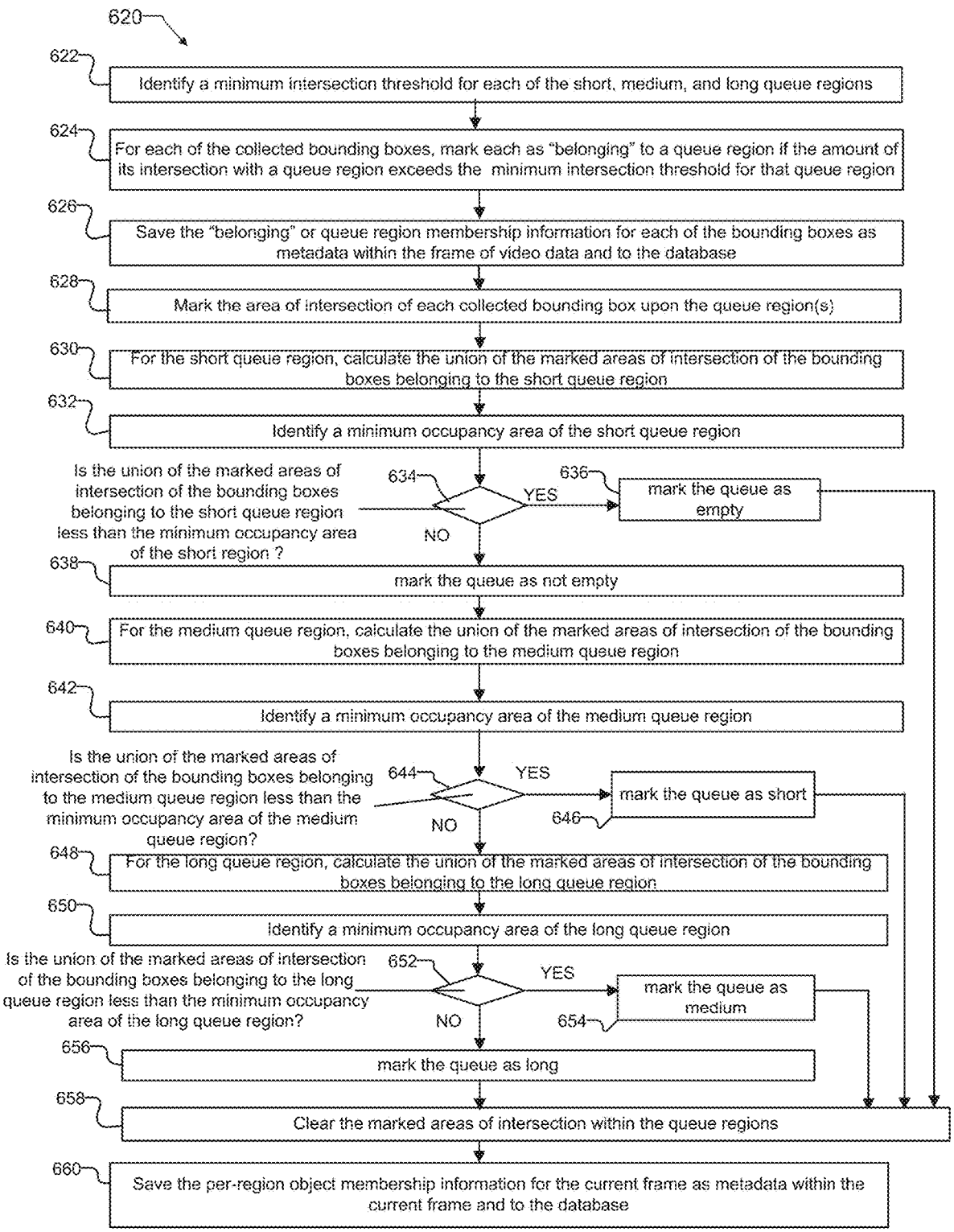
FIG. 8 is a flowchart showing a method for determining whether objects belong to one or more of the queue regions forming the queue area, and for determining the length of the queue area.

FIG. 8 provides detail for step 620 of FIG. 5A.

In step 622, the analytics system 132 identifies a minimum intersection threshold 146-1, 146-2, and 146-3 for each of the short 144-1, medium 144-2, and long 144-3 queue regions, respectively.

Figure 9A:
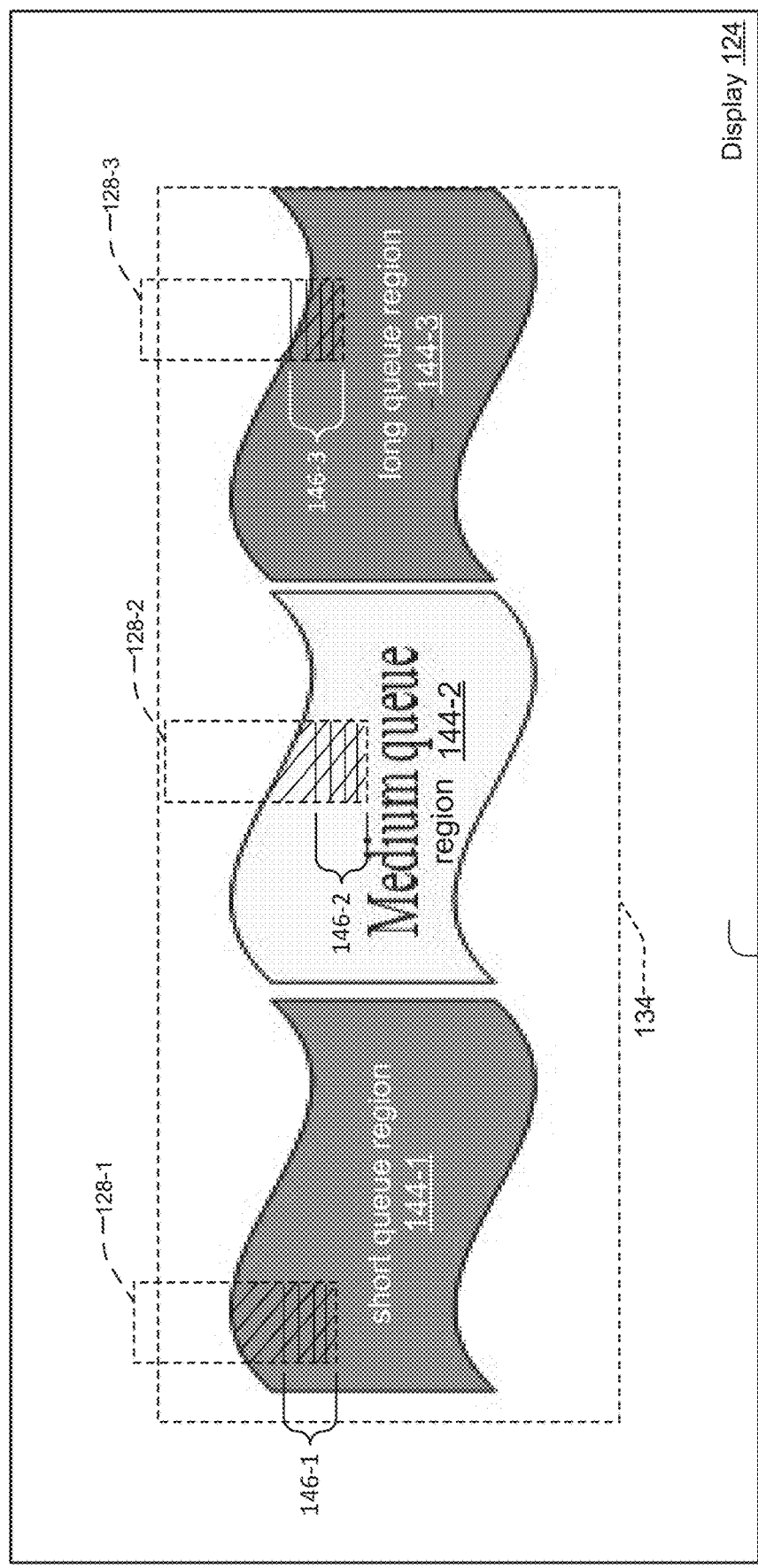
FIG. 9A and FIG. 9B are schematic diagrams showing queue regions and the queue area that support the method of FIG. 8.

FIG. 9A shows example minimum queue region intersection thresholds 146 defined for each of the queue regions forming the queue area 134. If a bounding box 128 intersects with a queue region by at least an amount equal to that region's minimum queue region intersection threshold 146, the analytics system 132 marks the object associated with the bounding box 128 as "belonging to" that region. This is important because the analytics system 132 determines the number of objects or individuals within each queue region by counting the number of bounding boxes 128 determined to "belong" within that queue region.

In the example, bounding boxes 128-1, 128-2, and 128-3 intersect with the short queue region 144-1, medium queue region 144-2, and long queue region 144-3, respectively. Bounding box 128-1 intersects with the short queue region 144-1 by at least the minimum short queue region intersection threshold 146-1. Bounding box 128-2 intersects with the medium queue region 144-2 by at least the minimum medium queue region intersection threshold 146-2. However, bounding box 128-3 does not intersect with the long queue region 144-1 by at least the minimum long queue region intersection threshold 146-3. As a result, the analytics system 132 concludes that the object associated with bounding box 128-1 belongs to short queue region 144-1, the object associated with bounding box 128-2 belongs to medium queue region 144-2, and the object associated with bounding box 128-3 does not belong to any region.

Returning to FIG. 8, in step 624, for each of the collected bounding boxes 128, the analytics system 132 marks each object as "belonging" to a queue region if the amount of its intersection of its bounding box 128 with a queue region exceeds the minimum intersection threshold 146 for that queue region. In step 626, the method saves the "belonging" or queue region membership information for each of the bounding boxes as metadata within the frame of video data and to the metadata database 162, in examples. Then, in step 628, the analytics system 132 marks the area of intersection of each collected bounding box 128 upon the queue region(s) as a first step in determining the queue length.

Figure 9B:
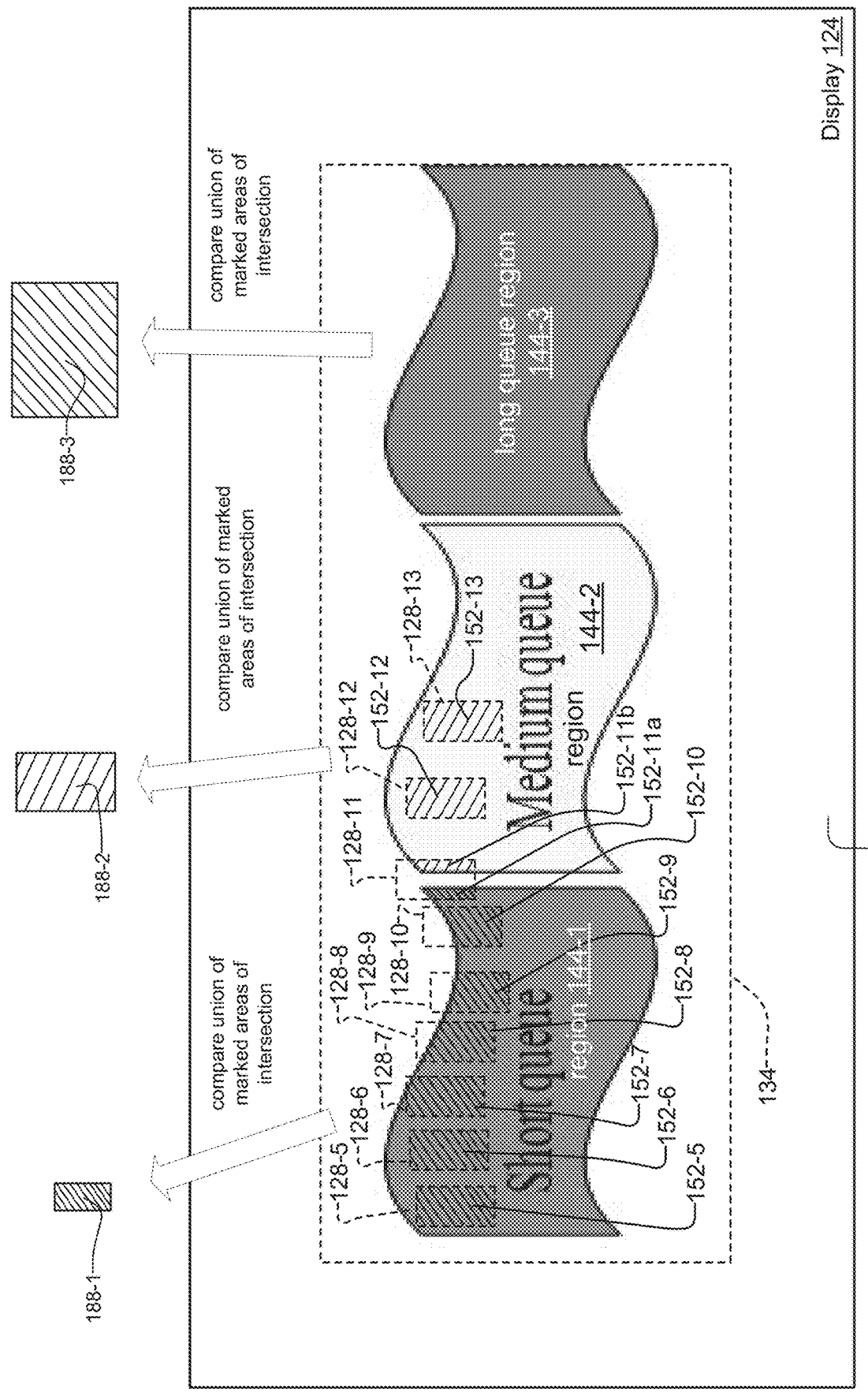

FIG. 9B provides an example for how the analytics system 132 calculates the queue length. First, the analytics system 132 marks an area of intersection of each collected bounding box 128 upon the queue region(s). Then, the analytics system 132 calculates a separate union of the marked areas of intersection 152 for all bounding boxes 128 belonging to each of the short 144-1, medium 144-2, and long 144-3 queue regions.

Then, the union of the marked areas of intersection 152 for each of the queue regions is compared to an operator-defined minimum occupancy area 188 for each of the queue regions. Preferably, the short 144-1, medium 144-2, and long 144-3 queue regions can each have separate minimum short 188-1, medium 188-2, and long 188-3 occupancy areas.

In the example, the minimum occupancy area of the short region 188-1 covers the smallest area of the occupancy areas. However, the minimum occupancy areas 188 for each of the regions can be of any area that is less than the area of its respective queue region. The marked areas of intersection 152 for objects belonging to the short queue region 144-1 include marked areas of intersection 152-5 through 152-10 and 152-11a, associated with bounding boxes 128-5 through 128-11. In a similar fashion, the marked areas of intersection 152 for objects belonging to the medium queue region 144-2 include marked areas of intersection 152-11b, 152-12, and 152-13, associated with bounding boxes 128-11, 128-12, and 128-13. Though no objects/bounding boxes belong to the long queue region 144-3, the analysis is the same for the long queue region 144-3.

Returning to FIG. 8, in step 630, the analytics system 132 first analyzes the short queue region 144-1. For the short queue region 144-1, the analytics system 132 calculates the union of marked areas of intersection 152 of the bounding boxes 128 belonging to the short queue region 144-1, and identifies the minimum occupancy area 188-1 of the short queue region 144-1 in step 632

In step 634, the analytics system 132 determines if the union of the marked areas of intersection 152 of the bounding boxes 128 belonging to the short queue region 144-1 is less than the minimum occupancy area 188-1 of the short queue region 144-1. If this statement is true, the analytics system 132 marks the queue as empty in step 636, and transitions to step 658 to bypass analysis of the remaining queue regions. Otherwise, the method transitions to step 638 and marks the queue as not empty.

Then, for the medium queue region 144-2, the method calculates the union of the marked areas of intersection 152 of the bounding boxes 128 belonging to the medium queue region 144-2, according to step 640. The method identifies the minimum occupancy area 188-2 of the medium queue region 144-2 in step 642.

According to step 644, the analytics system 132 determines if the union of the marked areas of intersection 152 of the bounding boxes 128 belonging to the medium queue region 144-2 is less than the minimum occupancy area 188-2 of the medium queue region 144-2. If this statement is true, the analytics system 132 marks the queue as short in step 646, and transitions to step 658 to bypass analysis of the remaining queue regions. Otherwise, the method transitions to step 648.

In step 648, for the long queue region 144-3, the analytics system 132 calculates the union of marked areas of intersection 152 of the bounding boxes 128 belonging to the long queue region 144-3, and identifies the minimum occupancy area 188-3 of the short queue region 144-3 in step 650.

Then, in step 652, the analytics system 132 determines if the union of the marked areas of intersection 152 of the bounding boxes 128 belonging to the long queue region 144-3 is less than the minimum occupancy area 188-3 of the long queue region 144-3. If this statement is true, the analytics system 132 marks the queue as medium in step 654, and transitions to step 658. Otherwise, the method transitions to step 656 to mark the queue as long, and transitions to step 658.

Step 658 clears the marked areas of intersection 152 within the queue regions, and transitions to step 660. This resets buffers to enable calculation of the queue length for the next or subsequent frame 108 of video data.

In step 660, the analytics system 132 saves the per-region object membership information for the current frame of video data and queue length event trigger information within the frame of video data 108 and to the metadata database 162. This enables the generation of queue-related statistics associated with the queue regions. In one example, an operator can determine queue utilization as a function of queue length across a range of video data frames, by calculating the amount of time that each queue area 134 was of a particular queue length. Returning to FIG. 5A, upon completion of step 620, the method transitions to step 622. In response to changes in the queue length and other occurrences that satisfy the event triggers, the video analytics system 132 sends audio messages to the loudspeaker 164 and electronic alert messages over the security network 136 to the security system workstation 120, in one example. The audio messages and electronic alert messages might indicate the need to change retail staffing assignments to address changes in the length of the queue 134.

Figure 5B:
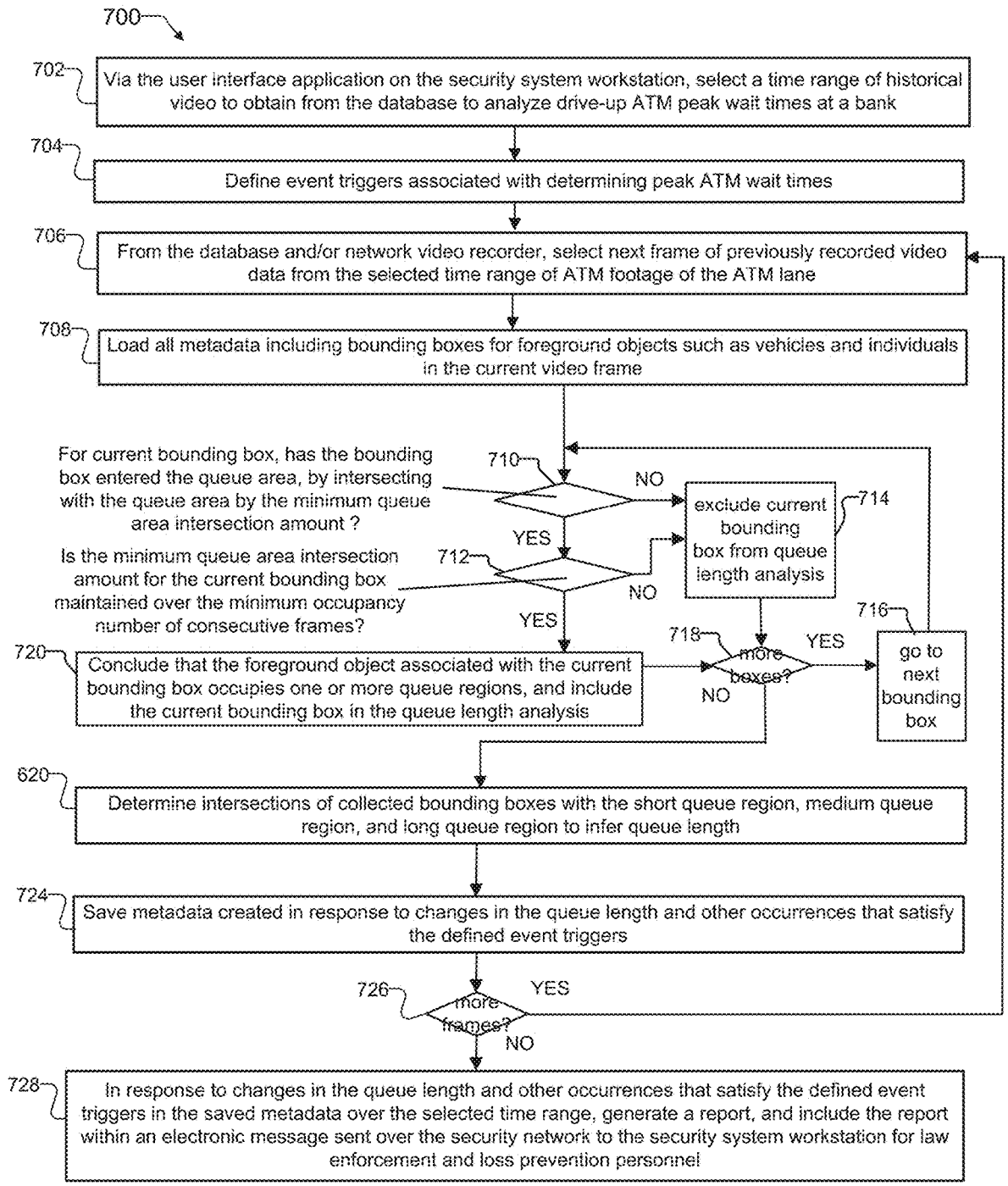
FIG. 5B is a flow chart of a method for forensic processing of historical video data footage of the bank ATM lane in FIG. 2, also according to principles of the present invention.

FIG. 5B shows an exemplary method 700 for processing of historical video data footage of the ATM lane 174 in FIG. 2, to show one specific example. The example infers movement of vehicles 182 relative to a queue area 134 within the ATM lane 174.

In step 702, via the user interface application 123 on the security system workstation 120, an operator selects a time range of historical video to obtain from the database 162 to analyze peak wait times at a drive-up ATM lane 174 of a bank 176. In step 704, the operator defines event triggers associated with determining peak wait times at the ATM 184. Then, in step 706, from the database 162 and/or network video recorder 130, the operator selects the next frame of previously recorded video data from the selected time range.

According to step 708, the analytics system 132 loads all metadata including bounding boxes 128 for foreground objects such as vehicles 182 and/or individuals 112 in the current video frame 108. The metadata including the bounding boxes 128 were generated previously by the analytics system 132 during live processing of the video data, and were saved within the video data and/or metadata database 162 for future forensics-based usage. The method then transitions to step 710.

In step 710, the method determines if the current bounding box 128 for a vehicle 182 has entered the queue area 134. The vehicle 182 has entered the queue area 134 if its bounding box 128 intersects with the queue area 134 by at least the minimum queue area intersection amount 142. If the vehicle 182 has entered the queue area 134, the method transitions to step 712 to determine if objects entering the queue area remain within the queue area for a minimum occupancy period and are therefore not transient. Otherwise, the method transitions to step 714.

Upon completion of step 712, the method transitions to step 720 if the current bounding box 128 was determined to have entered the queue area, and remained within the queue area for at least the minimum consecutive number of frames 148. Otherwise, the method transitions to step 714.

Step 714 is reached when the bounding boxes 128 associated with an object were determined to be effectively outside of the queue area 134. As a result, step 714 removes the bounding box 128 from the queue length analysis, and transitions to step 718 to look for more bounding boxes 128 within the video data.

Step 720 is reached when the bounding box 128 associated with each object was determined to be within the queue area 134. In step 720, the analytics system 132 concludes that the foreground object associated with the bounding box 128 occupies one or more queue regions and includes the bounding box 128 as part of the analysis for determining the queue length. In this example, the foreground objects are vehicles 182. The method then transitions to step 718 to look for more bounding boxes 128.

If there are more bounding boxes 128 to process in step 718, the method transitions to step 716 to go to the next bounding box 128. Otherwise, the method transitions to step 620. Upon completion of step 716, the method transitions to the beginning of step 710 to determine if the next bounding box 128 has entered the queue area 134.

In step 620, the method determines intersections of the bounding boxes 128 collected in step 720 with the short, medium, and long queue regions 144-1, 144-2, and 144-3, respectively, to infer the length of the queue area 134.

As with step 620 of method 600 in FIG. 5A. FIG. 8 provides detail for step 620 of FIG. 5B.

Returning to FIG. 5B, the method transitions to step 724. In step 724, the method saves metadata created in response to changes in the queue length and other occurrences that satisfy the defined event triggers. In step 726, if there are more frames to process, the method transitions back to step 706 to select the next frame of historical footage to process. Otherwise, the method transitions to step 728.

In step 728, in response to changes in the queue length and other occurrences that satisfy the defined event triggers in the saved metadata over the selected time range, the analytics system 132 generates a report 178, and include the report 178 within an electronic message sent over the security network 136 to the security system workstation 120 for law enforcement and loss prevention personnel.

The present invention also utilizes a finite state machine (FSM) to reduce ephemeral motion of foreground objects such as individuals 122 and vehicles 182 across frames of video data. This enables more accurate calculations for determining whether the objects have entered or exited a queue region of the queue area 134.

As the analytics system 132 processes one frame of video data to another, the FSM determines whether each object remains in its current state or transitions to another state. All objects are initially in an UNKNOWN state. States also include OUT-OF-REGIONS, and IN-REGION-N, where N is a unique number assigned to each of the queue regions forming the queue area 134.

An objects transitions from a current state S1 to a next state S2, using the notation "S1→S2" according to the exemplary state transition table below. In the description, each tracking mask 128 associated with an object is determined to "sufficiently" overlap with a queue region by a predetermined amount defined by an operator. The exemplary state transition table is included herein below:

---

UNKNOWN → UNKNOWN when an object does not have an associated bounding box 128 or tracking mask in the next frame
UNKNOWN → OUT-OF-REGIONS when object has a bounding box 128 in the next frame that does not overlap sufficiently with any queue regions
UNKNOWN → IN-REGION-1 when object has a bounding box 128 in the next frame that overlaps sufficiently with a queue region "1"
OUT-OF-REGIONS → OUT-OF-REGIONS when an object has a bounding box 128 in the next frame that does not overlap sufficiently with any queue regions
OUT-OF-REGIONS → UNKNOWN when an object does not have a bounding box 128 in the next frame
OUT-OF-REGIONS → IN-REGION-1 when an object has a bounding box 128 in the next frame that overlaps sufficiently with a queue region "1"
IN-REGION-1 → IN-REGION-2 when an object has a bounding box 128 in the next frame that overlaps sufficiently with a queue region "1"
IN-REGION-1 → UNKNOWN when an object does not have a bounding box 128 in the next frame
IN-REGION-1 → OUT-OF-REGIONS when an object has a bounding box 128 in the next frame that does not overlap sufficiently with any queue regions
IN-REGION-N → IN-REGION-N when an object has a bounding box 128 in the next frame that overlaps sufficiently with queue region "N"
IN-REGION-N → UNKNOWN when an object does not have a bounding box128 in the next frame
IN-REGION-N → OUT-OF-REGIONS when an object has a bounding box 128 in the next frame that does not overlap sufficiently with any queue regions

---

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of operation of a finite state machine of a video analytics system for determining whether an object has entered or exited regions in frames of video data, the method comprising: defining the regions of the frames, wherein the regions are queue regions forming a queue area; determining that the object has transitioned to a state indicating that the object has exited the regions, when the object has a tracking mask in the next frame of video data that does not overlap with any of the regions; determining that the object has transitioned to a state indicating that the object has entered an identified region of the regions, when the object has a tracking mask in the next frame of video data that overlaps with the identified region; and determining a length of a queue by successively determining if each of the regions is occupied by calculating a union, for each of the regions, of marked areas of intersection of the objects upon the queue regions; and comparing the union of the marked areas of intersection of the objects belonging to each of the regions, to a minimum occupancy area for each of the regions.

2. The method of claim 1, further comprising initially assigning the object to an unknown state, and transitioning the object to an out-of-region state when the tracking mask of the object does not overlap with any of the regions.

3. The method of claim 2, further comprising determining that the object remains in the unknown state when the object does not have a bounding box in a next frame of the video data.

4. The method of claim 1, wherein overlap of a tracking mask with a region is determined when the tracking mask intersects with the region by at least a predetermined amount.

5. The method of claim 1, further comprising determining a number of objects that are within an area by counting the objects that belong to the one or more queue regions forming the queue area.

6. The method of claim 1, further comprising enabling drawing of the regions over video data.

7. The method of claim 1, wherein the regions are rectangular.

8. The method of claim 1, wherein the regions are trapezoidal.

9. A video analysis system for monitoring queues, comprising: at least one video camera generating video data of a monitored area; and a video analytics system that executes a finite state machine for determining whether an object has entered or exited regions in frames of video data, by defining the regions of the frames wherein the regions are queue regions forming a queue area, determining that the object has transitioned to a state indicating that the object has exited the regions, when the object has a tracking mask in the next frame of video data that does not overlap with any of the regions, determining that the object has transitioned to a state indicating that the object has entered an identified region of the regions, when the object has a tracking mask in the next frame of video data that overlaps with the identified region; and determining a length of a queue by successively determining if each of the regions is occupied by calculating a union, for each of the regions, of marked areas of intersection of the objects upon the queue regions and comparing the union of the marked areas of intersection of the objects belonging to each of the regions, to a minimum occupancy area for each of the regions.

10. The system of claim 9, wherein overlap of a tracking mask with a region is determined when the tracking mask intersects with the region by at least a predetermined amount.

11. The system of claim 9, wherein the video analytics system determines a number of objects that are within an area by counting the objects that belong to the one or more queue regions forming the queue area.

12. The system of claim 9, wherein the video analytics system enables an operator to draw the regions over video data.

13. A method of operation of a finite state machine of a video analytics system for determining whether an object has entered or exited regions in frames of video data, the method comprising: for each frame of the frames of video data, identifying a tracking mask associated with the object in a current frame and determining whether the object remains in a current state or transitions to a new state based on the tracking mask for the object in a next frame, including: determining that the object remains in or has transitioned to an unknown state when the object does not have a bounding box in the next frame; determining that the object remains in or has transitioned to a state indicating that the object has exited the regions, when the object has a tracking mask in the next frame that does not overlap with any of the regions by at least a predetermined amount; determining that the object remains in or has transitioned to a state indicating that the object has entered an identified region of the regions when the object has a tracking mask in the next frame that overlaps with the identified region by at least the predetermined amount, determining whether a particular region is occupied by marking, for each object that was determined to have entered the particular region, an area of intersection between the particular region and the tracking mask for the object, and determining a length of a queue by successively determining if each of the regions is occupied by calculating a union of all marked areas of intersection for the particular region, and determining that the region is occupied in response to determining that the union of the marked areas of intersection for the particular region is not less than a predetermined minimum occupancy area for the particular region.

14. The method of claim 13, further comprising initially assigning the object as being in the unknown state.

15. The method of claim 13, wherein the predetermined amount is defined by an operator of the video analytics system.

* * * * *